United States Patent
Christison et al.

(10) Patent No.: US 9,615,037 B2
(45) Date of Patent: Apr. 4, 2017

(54) METHOD AND SYSTEM FOR OUTPUT OF DUAL VIDEO STREAM VIA A SINGLE PARALLEL DIGITAL VIDEO INTERFACE

(71) Applicant: DRS Network & Imaging Systems, LLC, Melbourne, FL (US)

(72) Inventors: Gregory Christison, McKinney, TX (US); Chris Reed, Melbourne, FL (US); Bracey J. Blackburn, Melbourne, FL (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 258 days.

(21) Appl. No.: 14/536,439

(22) Filed: Nov. 7, 2014

(65) Prior Publication Data

US 2015/0130949 A1    May 14, 2015

Related U.S. Application Data

(60) Provisional application No. 61/901,817, filed on Nov. 8, 2013.

(51) Int. Cl.
    *H04N 5/33*   (2006.01)
    *H04N 7/18*   (2006.01)
    *H04N 5/232*  (2006.01)
    *H04N 9/07*   (2006.01)

(52) U.S. Cl.
    CPC ........... *H04N 5/33* (2013.01); *H04N 5/23229* (2013.01); *H04N 5/23293* (2013.01); *H04N 9/07* (2013.01)

(58) Field of Classification Search
    None
    See application file for complete search history.

(56) References Cited

U.S. PATENT DOCUMENTS

| | | | |
|---|---|---|---|
| 8,212,837 | B1 | 7/2012 | Chernett et al. |
| 2004/0232333 | A1 | 11/2004 | Guldevall |
| 2004/0252303 | A1* | 12/2004 | Giorgianni ............ G01J 3/508 356/402 |
| 2006/0023105 | A1 | 2/2006 | Kostrzewski et al. |
| 2011/0063427 | A1 | 3/2011 | Fengler et al. |
| 2012/0020551 | A1* | 1/2012 | Ito ....................... H04N 1/6019 382/162 |
| 2012/0224019 | A1 | 9/2012 | Samadani et al. |

OTHER PUBLICATIONS

International Search Report and Written Opinion mailed Feb. 24, 2015 in Int'l Patent Application No. PCT/US2014/064682, 9 pages.

* cited by examiner

*Primary Examiner* — Frederick Bailey
*Assistant Examiner* — Talha M Nawaz
(74) *Attorney, Agent, or Firm* — Kilpatrick Townsend & Stockton LLP (57) ABSTRACT

A method of operating a video camera includes capturing a scene of imaging data using the video camera, wherein the imaging data is characterized by a first bit depth and processing the imaging data to provide display data characterized by a second bit depth less than the first bit depth. The method also includes framing the imaging data and the display data and outputting the framed imaging and display data.

7 Claims, 10 Drawing Sheets

| | |
|---|---|
| | Pre AGC 640 |
| | Pre AGC 639 |
| | ... |
| | Pre AGC 5 |
| | Pre AGC 4 |
| | Pre AGC 3 |
| | Pre AGC 2 |
| | Pre AGC 1 |
| Y640 Y639 | Cr |
| Y639 | Cb |
| ... | |
| Y8 | Cr |
| Y7 | Cb |
| Y6 | Cr |
| Y5 | Cb |
| Y4 | Cr |
| Y3 | Cb |
| Y2 | Cr |
| Y1 | Cb |

METHOD AND SYSTEM FOR OUTPUT OF DUAL VIDEO STREAM VIA A SINGLE PARALLEL DIGITAL VIDEO INTERFACE

CROSS-REFERENCES TO RELATED APPLICATIONS

This application claims priority to U.S. Provisional Patent Application No. 61/901,817, filed on Nov. 8, 2013, entitled "Method and System for Output of Dual Video Stream via a Single Parallel Digital Video Interface," the disclosure of which is hereby incorporated by reference in its entirety for all purposes.

SUMMARY OF THE INVENTION

The present invention relates generally to video systems. Merely by way of example, the methods, systems, and apparatuses described herein have been applied to video processing and delivery of video streams in video cameras, including thermal imaging cameras. The invention has wide applicability to video data and the delivery thereof.

Although video interfaces have been demonstrated, embodiments of the present invention provide functionality not available using conventional techniques. As described herein, a single interface is utilized to provide two video streams that contain different levels of video processing on the same sensor content. In other words, a single video stream is provided by embodiments that contains video imagery with two different levels of video processing from the same sensor.

According to an embodiment of the present invention, a method of operating a video camera is provided. The method includes capturing a scene of imaging data using the video camera, wherein the imaging data is characterized by a first bit depth and processing the imaging data to provide display data characterized by a second bit depth less than the first bit depth. The method also includes framing the imaging data and the display data and outputting the framed imaging and display data.

According to another embodiment of the present invention, a method of operating a thermal imaging system is provided. The method includes capturing a scene of imaging data using a thermal imager, wherein the imaging data is characterized by a first bit depth and processing the imaging data to provide display data characterized by a second bit depth less than the first bit depth. The method also includes processing the imaging data to provide radiometric data characterized by a third bit depth greater than the first bit depth and framing the radiometric data and the display data. The method further includes outputting the framed radiometric and display data.

According to a specific embodiment of the present invention, a thermal imaging system is provided. The thermal imaging system includes one or more optical elements operable to collect infrared light and a camera core optically coupled to the one or more optical elements. The camera core includes an FPA module providing imaging data at a first bit depth, a color conversion module coupled to the FPA module and operable to process the imaging data to provide display data, and a framer coupled to the FPA module and the color conversion module and operable to form a super frame including the imaging data and the display data. The thermal imaging system also includes a communications module coupled to the camera core and an input/output module coupled to the communications module.

Numerous benefits are achieved by way of these techniques over conventional methods. For example, embodiments provide a method to output two video streams from a camera core in a single super frame or video stream without adding any significant cost, power, or cabling/pins onto the core. Some applications include processing of one of the two streams through a video analytics algorithm while the other of the two streams is used as the "viewable" (e.g., human viewable) stream. Using embodiments of the present invention, a single video stream that contains video imagery with two different levels of video processing is provided. This contrasts with conventional methods in which two video streams in the form of two separate packets of data with two different destination ports are used to communicate signals with different levels of processing. In embodiments, of the present invention, a single stream is used that is output at a single destination port. These and other details of embodiments along with many of their advantages and features are described in the following description, claims, and figures.

DETAILED DESCRIPTION OF SPECIFIC EMBODIMENTS

Embodiments of the present invention provide methods and systems to output a 'super frame' that includes both 'raw' video (e.g., 14-bit 'raw' video, which can be utilized by an analytics engine) as well as contrast enhanced video (e.g., 8-bit contrast enhanced video suitable for use with imaging displays) from a thermal camera core using a single, parallel digital video interface. In other embodiments as described herein, the Super Frame can include 16-bit radiometric data along with 8-bit gray scale data represented, for example, in YUV format. Embodiments of the present invention utilize a 'super frame' format to provide both video streams in which the number of pixels per line can be doubled. Thus, embodiments of the present invention can transmit two different images or representations of the same scene in a single frame. In other words, the method provides a clean solution to output two (or more) representations of the same sensor output data that have different levels of video processing applied.

Thus, embodiments of the present invention utilize a camera core that outputs two video streams of different bit depth resolution and provide them, for example, to a video board that outputs an Ethernet IP stream. The sensor data obtained by the video core is processed at multiple levels in the camera core as described herein to provide the two different video streams that are based on the same sensor data. In contrast with conventional techniques, the super frame is utilized to enable a single physical interface to carry two video streams provided by the processing engine in the camera core.

Figure 1:
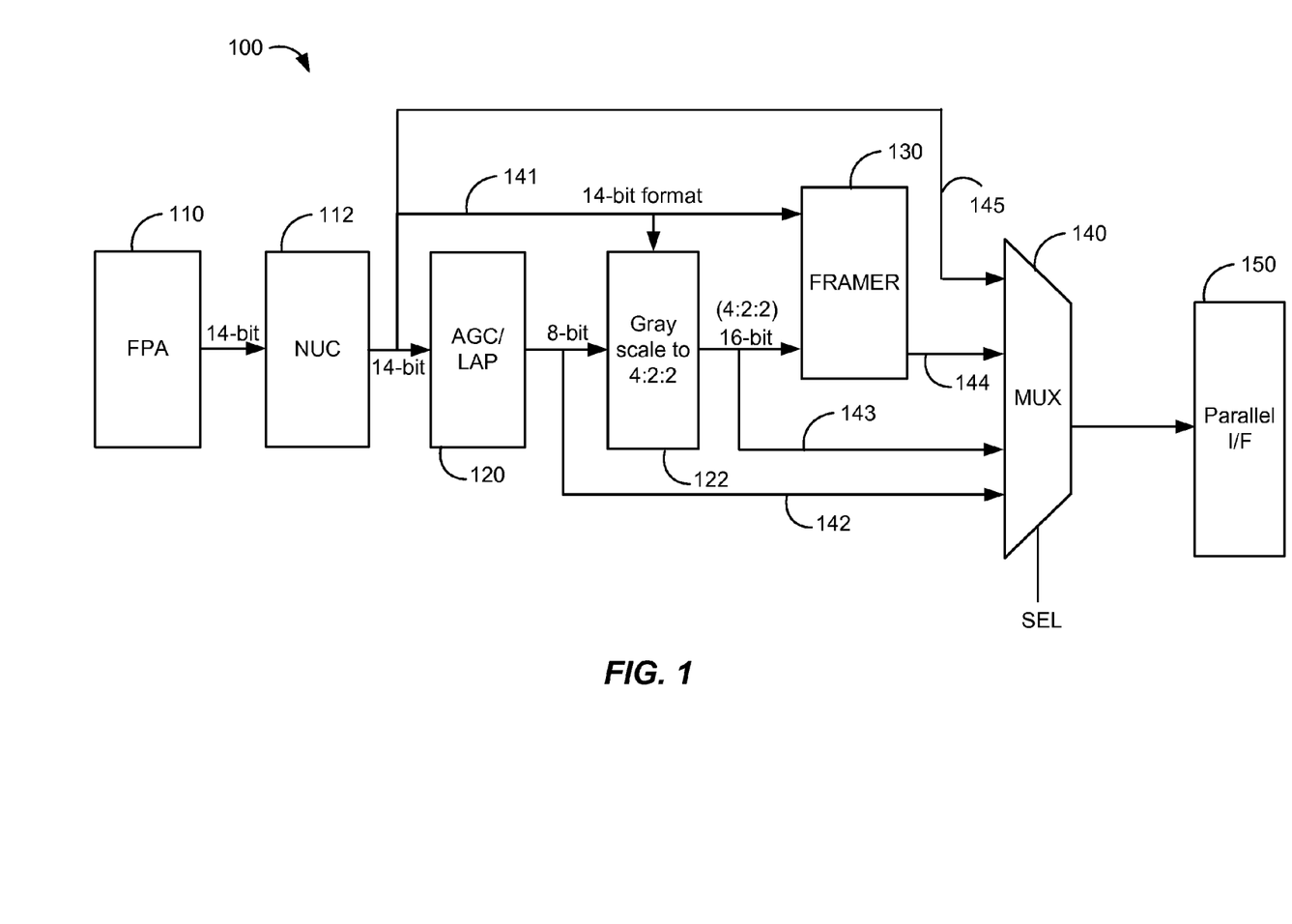
FIG. 1 is a simplified block diagram of a dual stream video system according to an embodiment of the present invention.

FIG. 1 is a simplified block diagram of a dual stream video system according to an embodiment of the present invention. The dual stream video system 100, which can be referred to as a camera core, includes a focal plane array (FPA) 110 that collects incident radiation. As an example, the FPA 110 can be a 17 μm pixel pitch, long wave infrared (LWIR) FPA that is useful in obtaining thermal video and/or still imagery. The FPA, also referred to as a sensor, can have one of several resolutions, including 640×480, 320×240 or the like. Of course, other pixel pitch, operating wavelengths, and sensor resolutions are included within the scope of the present invention. In the illustrated embodiment, the bit depth of the signal output by the FPA is 14 bits. This 14-bit raw data stream is used in an exemplary manner throughout this disclosure, but other bit depths are included within the scope of the present invention. One of ordinary skill in the art would recognize many variations, modifications, and alternatives.

The video signal from the FPA 110 is provided to a non-uniformity correction (NUC) module 112 that corrects for pixel-to-pixel non-uniformities present across the sensor as well as performing optional temperature compensation. The NUC module 112 provides a 14-bit non-uniformity corrected output to multiple modules in the embodiment illustrated in FIG. 1. The FPA 110 and the NUC module 112 can be considered as an image capture module that receives infrared light, corrects for detector non-uniformity, and outputs imaging data. In some embodiments, the imaging data is referred to as raw data, but it should be understood that the use of the term raw data in this context includes processing such as non-uniformity correction and other suitable imaging processing techniques.

FIG. 1 illustrates the multiple video processing paths that are utilized to implement the embodiments described herein. Additional description related to non-uniformity correction is provided in U.S. patent application Ser. No. 14/211,796, filed on Mar. 14, 2014, the disclosure of which is hereby incorporated by reference in its entirety for all purposes. The output of the NUC module 112 is referred to herein as 'raw' data, signifying that the data has not been processed other than for the non-uniformity correction. Embodiments of the present invention are not limited to 'raw' data in the sense of only non-uniformity correction, but include implementations in which data processed at a first bit depth is provided in the super frame interleaved with data of a second, reduced bit depth.

If the raw 14-bit image after NUC was displayed to a user, the quality would be very poor since the image would be gray and washed out. Accordingly, to improve the display experience, the raw data is provided at the original bit depth to the automatic gain control (AGC)/local area processing (LAP) module 120 in which AGC and/or LAP is performed. This module can also be referred to as an image contrast enhancement module. The AGC/LAP module 120 performs contrast enhancement processing, edge detection, and the like to provide 8-bit video imagery that is suitable for use in user displays. This 8-bit video stream can be displayed to users, providing the desired contrast.

Although 8-bit data is illustrated in FIG. 1, this is not required by the present invention and other reduced bit depths can be utilized as appropriate to the particular application. The contrast enhanced video data output from the AGC/LAP module 120 is provided to the multiplexer 140, which can select this contrast enhanced video data as an output to the parallel interface 150.

As illustrated in FIG. 1, the raw data from the NUC module 112 and the contrast enhanced data (i.e., the 8-bit video stream) is provided to a colorizer module 122 that converts the gray scale/contrast enhanced data to a color format, also referred to as a color video stream, for example, the 4:2:2 color format, the YUV color format, or the like. The colorizer module 122 can also be referred to as a YUV processing module. In the 4:2:2 color format, the gray scale or luminance information of the pixel (4 bytes of Y data) is provided at twice the data size of the color information (2 bytes of U (Cb) data and 2 bytes of V (Cr) data), providing a 16-bit color (i.e., 4:2:2) video signal. The AGC/LAP module 120 and the colorizer module 122 can be considered as a color conversion module that receives imaging data and outputs display data.

In one implementation, the 4:2:2 data can be treated as an array of unsigned char values, where the first byte contains the first Y sample, the second byte contains the first U (Cb) sample, the third byte contains the second Y sample, and the fourth byte contains the first V (Cr) sample, as shown in Table 1, with increasing memory addresses proceeding to the right.

TABLE 1

| Y0 | U0 | Y1 | V1 | Y2 | U1 | Y3 | V1 | Y4 | U2 | Y5 | V2 |

If the image is addressed as an array of little-endian WORD values, the first WORD contains the first Y sample in the least significant bits (LSBs) and the first U (Cb) sample in the most significant bits (MSBs). The second WORD contains the second Y sample in the LSBs and the first V (Cr) sample in the MSBs.

The output of the colorizer module 122 is a 16-bit per pixel color video stream that is provided to the framer 130 for framing into the super frame. In other embodiments, other colorization protocols can be used to provide colorized data for framing and eventual display. One of ordinary skill in the art would recognize many variations, modifications, and alternatives.

Because some processing devices, for example, video analytics systems, can benefit from receiving the 14-bit video stream rather than the 8-bit video stream, embodiments of the present invention provide a dual video stream output from the camera core as described herein that is suitable for both processing of the 14-bit video stream as well as for display. Referring to FIG. 1, the 14-bit raw data is provided to framer 130 at the input 141. The framer 130 frames the 14-bit video signal with the 16-bit color video signal into a super frame as described more fully below.

The output of the framer 130 is provided to multiplexer 140, which can select one of the inputs to be provided as an output to the parallel interface 150. The framer is able to buffer up to a line of data in one implementation and more than one line of data in other implementations.

Although FIG. 1 illustrates a particular example of framing the 14-bit raw video stream with the 16-bit color video stream, embodiments of the present invention are not limited to this particular implementation. It is possible to frame other video streams provided at different points of the processing flow, for example, 8-bit gray scale and 14-bit raw data after NUC, 16-bit color and 14-bit raw data, 8-bit gray scale and 16-bit radiometric as described below, and the like.

The multiplexer 140 receives a plurality of inputs, for example, the raw 14-bit video data (input 145), the contrast enhanced 8-bit video data (input 142), the colorized 16-bit video data (input 143), and the super frame video data (input 144) and selects one of these inputs as the output that is provided to the parallel interface 150 based on the input provided at the select line SEL. Although framing of the raw data and the colorized data into a super frame is illustrated in FIG. 1, other embodiments combine the raw data and the contrast enhanced data in a super frame by providing the output of the AGC/LAP module 120 to the framer 130 instead of the output of the colorizer module 122. Accordingly, the multiplexer can select either one of the video streams (e.g., the display video stream, the colorized stream, the raw video stream, or the super frame video stream for delivery to the parallel interface 150 or to the LVDS interface discussed below.

Figure 2:
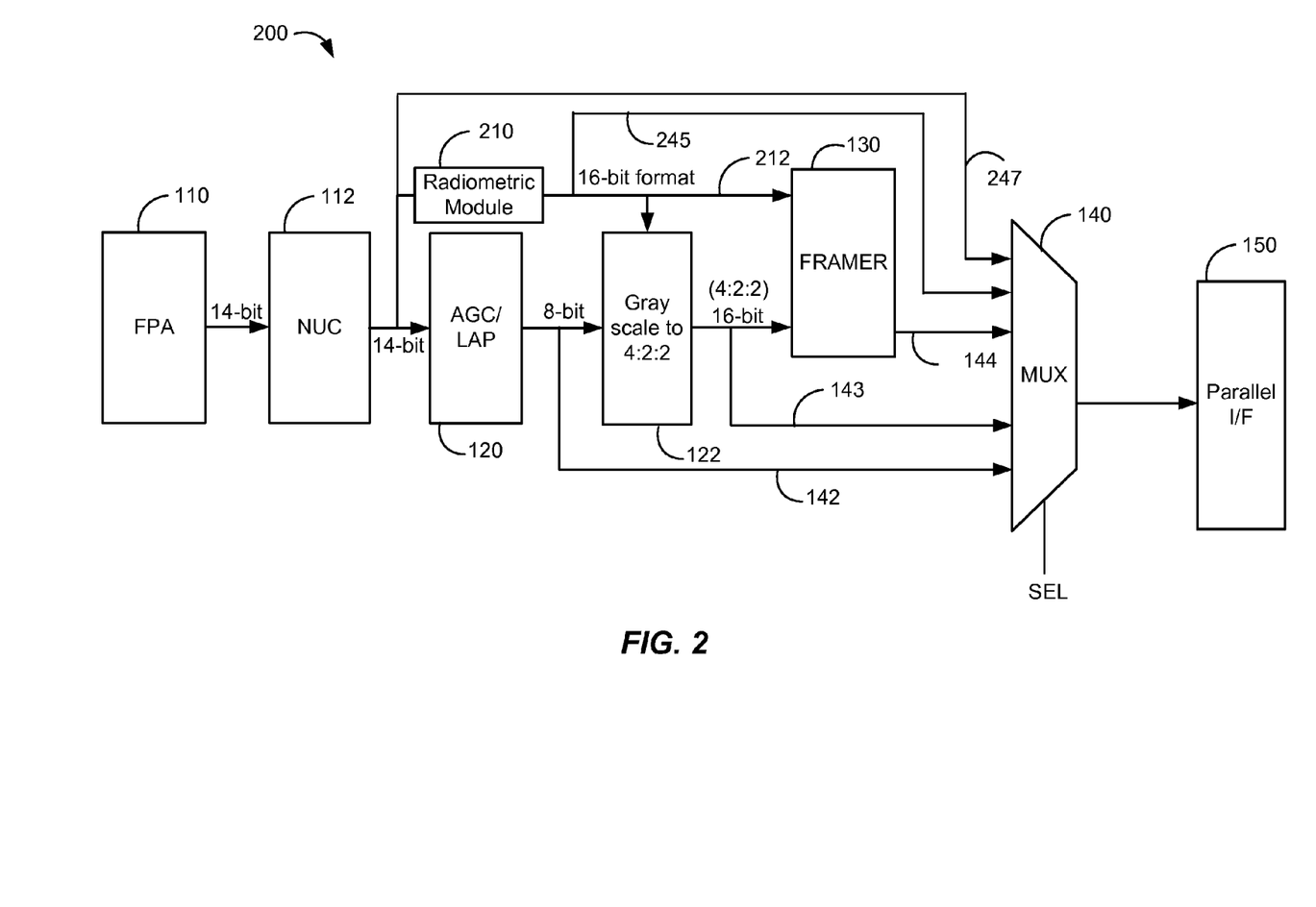
FIG. 2 is a simplified block diagram of a dual stream video system according to an alternative embodiment of the present invention.

FIG. 2 is a simplified block diagram of a dual stream video system 200 according to an alternative embodiment of the present invention. In the embodiment illustrated in FIG. 2, which shares similarities with the system illustrated in FIG. 1, the 14-bit raw data is converted to 16-bit radiometric data by radiometric module 210. The description provided in relation to the elements in FIG. 1 is applicable to the elements illustrated in FIG. 2 as appropriate.

The radiometry module 210 converts the 14-bit intensity data into a 16-bit temperature value, represented by 11 bits to define the integer portion of the temperature value in Kelvin and 5 bits to define the fractional portion of the temperature value in Kelvin. Of course, other configurations can be utilized in which fewer or more bits are used to define the integer and fractional portions of the value. The temperature data is provided to the multiplexer as input 212 and is framed together with either the colorized data (input 143) or the contrast enhanced data (not illustrated but available by providing input 142 to the framer 130) to form the super frame featuring radiometric temperature information. The radiometry module 210 can utilize radiometric lookup tables or other radiometric processing to convert the 14-bit video stream to produce a 16-bit radiometric video stream using the camera temperature, calibration data, and the like.

The framer 130 combines the 16-bit radiometric video stream with one of the other video signals (e.g., the contrast enhanced 8-bit video data (input 142) or the colorized 16-bit video data (input 143) for form the super frame. As illustrated in FIG. 2, the radiometric video data (input 245) can be passed through the multiplexer as an input to the parallel interface 150. In some embodiments, the raw data can also be passed through the multiplexer as an input to the parallel interface as illustrated by input 247 to multiplexer 140.

Figure 3:
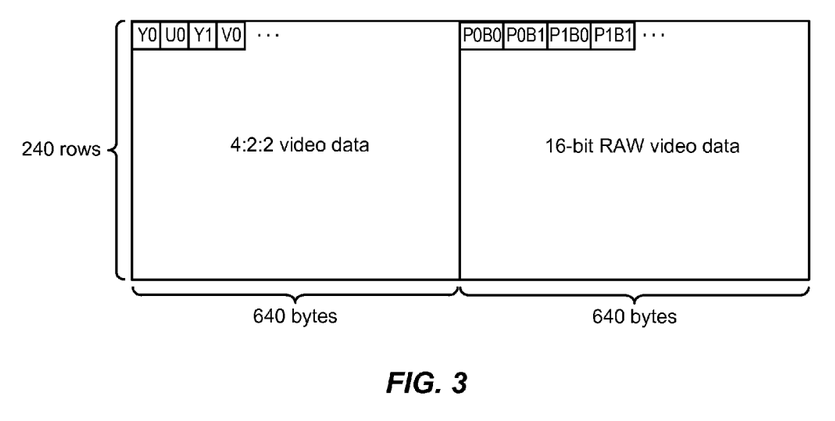
FIG. 3 is diagram illustrating a frame format for 320 pixel wide video output according to an embodiment of the present invention.

FIG. 3 is diagram illustrating a frame format for 320 pixel wide video output according to an embodiment of the present invention. The 4:2:2 super frame format shown in FIG. 3 is for a 320×240 sensor with 240 rows and illustrates how each row of 4:2:2 data is transmitted followed by the corresponding row of raw data. For two bytes per column, there are 640 bytes in each subframe. Accordingly, since the data is essentially 2-bytes per pixel, two clock cycles are used to clock out the data in some implementations.

Referring to FIG. 3, in the super frame, the first 640 bytes are for the processed data (e.g., color YUV data), with 16 bits per pixel. The second 640 bytes are the raw data (e.g., 16 bit radiometric or 14 bit raw data). Accordingly, each subframe of the super frame has a byte length twice the number of pixels with the same number of rows. In an embodiment, the output clock rate is increased, for example, from 10 MHz to 40.5 MHz, to maintain the original refresh rate for the display and raw data. Although a 320×240 sensor is illustrated, embodiments of the present invention are not limited to this particular spatial resolution and other resolutions, including 640×480 as discussed in relation to FIG. 4 can be utilized. In some embodiments, the frame rate is maintained at the original frame rate of the camera but delivers more data than a normal frame, for example, twice the data when the super frame has twice the data content of a normal frame.

The framer performs an interleaving function. The 14-bit data is illustrated as two bytes of the following format: PxBy, where x=the pixel number and y=the byte (either 0 or 1).

For example:
P0B0=Pixel 0, byte 0=bits 7-0,
P0B1=Pixel 0, byte 1=bits 15-8 (with bits 13-8 as valid data and bits 14 and 15 set to zero)

The data format illustrated in Table 1 is utilized for each row of the super frame as illustrated in FIG. 3. The framer includes a buffer that holds one line of data from the colorizer module and one line of data for the raw data and frames the data to be output on a parallel 8-bit bus (i.e., one byte per clock cycle). In other embodiments, a 16-bit bus is used with two bytes transmitted per clock cycle. As shown in FIG. 3, each row of the colorized data is 640 bytes since there are 320 pixels and each pixel uses two bytes. The 16 bits of the raw video data is broken up into an upper byte and a lower byte for each of the 320 pixels, resulting in 640 bytes of raw video data. For 14-bit data, two of the bits are set to zero to form the 16-bit video data.

Accordingly, the framer interleaves the 640 bytes of color data and the 640 bytes of raw video data to form the super frame. After framing, each row of colorized data is transmitted followed by the raw data in the same row.

Figure 4:
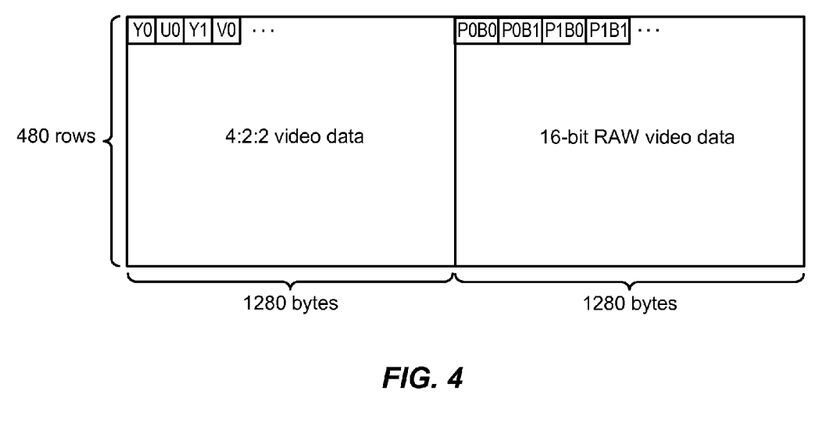
FIG. 4 is diagram illustrating a frame format for 640 pixel wide video output according to an embodiment of the present invention.

FIG. 4 is diagram illustrating a frame format for 640 pixel wide video output according to an embodiment of the present invention. For this higher pixel resolution sensor, the 640×480 pixels result in 480 rows with 1280 bytes per row.

Figure 5:
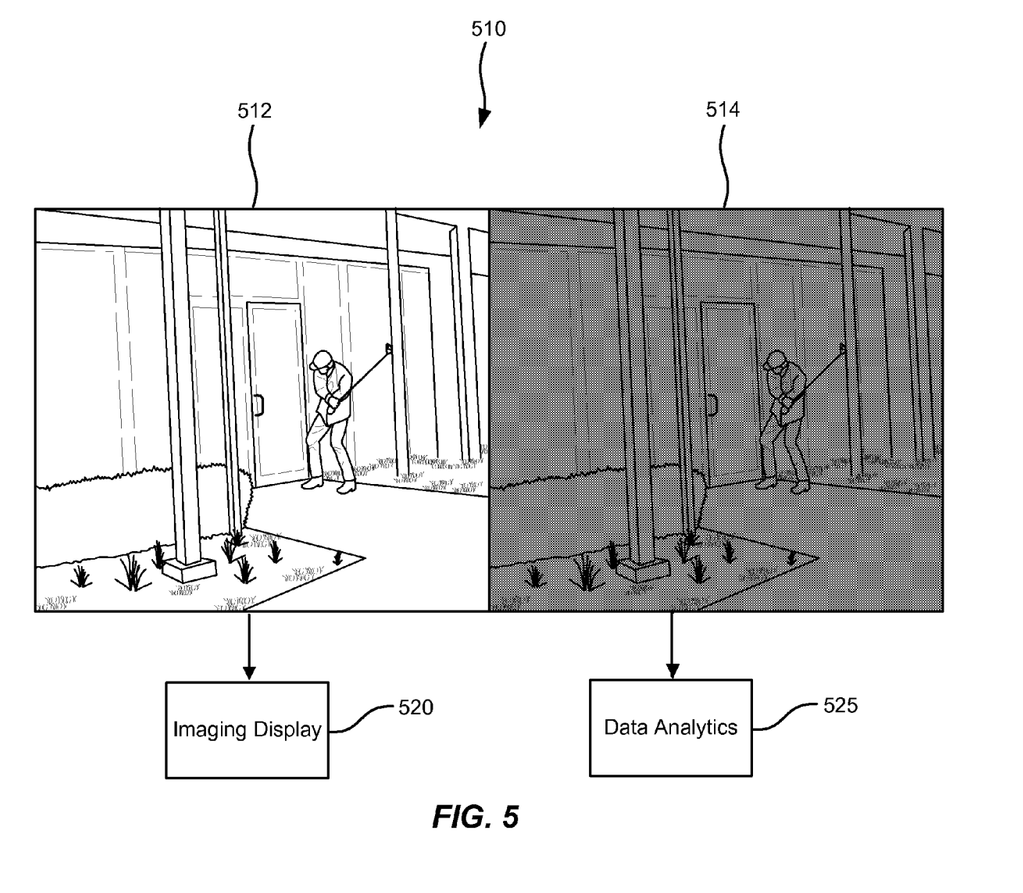
FIG. 5 is a diagram illustrating a super frame according to an embodiment of the present invention.

FIG. 5 is a diagram illustrating a super frame according to an embodiment of the present invention. As illustrated in FIG. 5, the super frame 510 includes both raw data 514 (e.g., 14-bit video) and a processed version 512 (i.e., processed data) of the raw data (e.g., 8-bit contrast enhanced video) that is suitable for imaging displays in a single super frame 510. The raw data 514 and the processed data 512 are output using a single parallel digital output. The processed data is aligned to the raw data to enable the user to switch between the raw and processed data without the need for hardware switches.

As illustrated in FIG. 5, the super frame output stream includes both 8-bit contrast enhanced video 512 and 14-bit video 514. The contrast enhanced video is very viewable, high contrast video, which is appropriate for display to a user. The 14-bit representation of the same scene illustrated by the raw data 514 appears washed out, but is useful in analytics modules and video processing since it is characterized by a higher bit depth resolution. By providing both the high bit depth images for analytics and the lower bit depth, contrast enhanced images for display in a single super frame, the present invention provides benefits not available using conventional techniques.

Figure 6A:
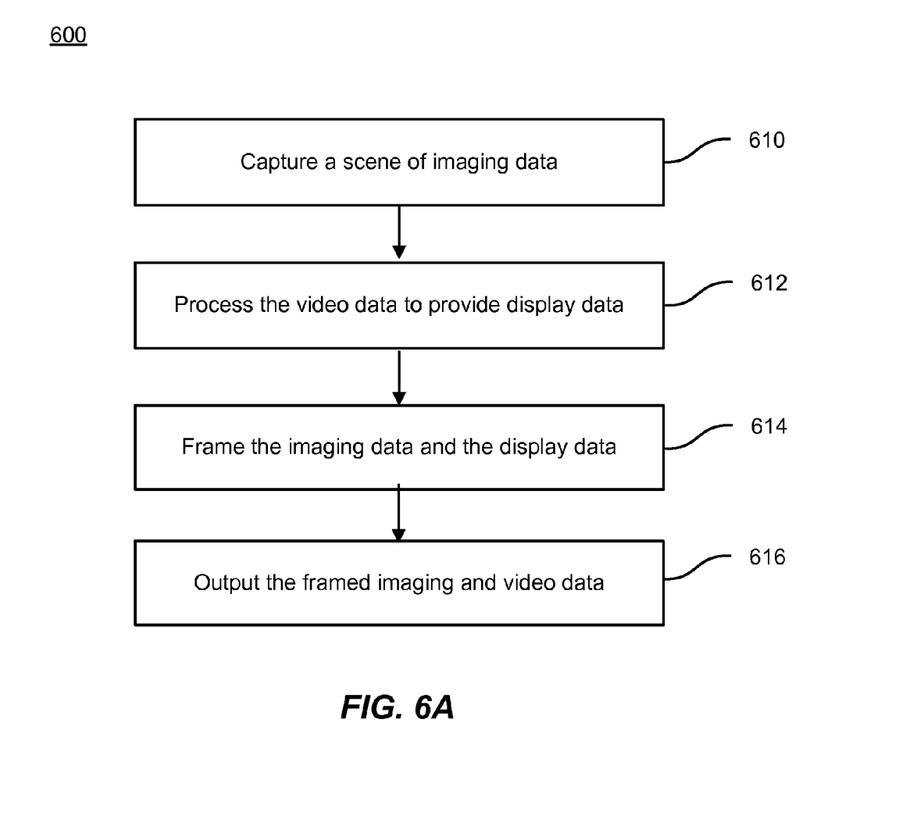
FIG. 6A is a simplified flowchart illustrating a method of providing a dual video stream according to an embodiment of the present invention.

FIG. 6A is a simplified flowchart illustrating a method of providing a dual video stream according to an embodiment of the present invention. The method 600 includes capturing a scene of imaging data using a video camera (610). The imaging data is characterized by a first bit depth, for example 14-bits. Capturing the scene of imaging data can include performing at least one of temperature compensation or non-uniformity correction in order to provide imaging data that compensates for non-uniformities across the detector, for example, a focal plane array, used to capture the imaging data. The method also includes processing the imaging data to provide display data characterized by a second bit depth less than the first bit depth (612). Processing the imaging data to provide display data can include performing gray scale conversion, performing image contrast enhancement, converting gray scale data to color data, or the like. As an example, 14-bit data can be converted to 8-bit data as the bit depth is reduced from the first bit depth to the second bit depth.

The method also includes framing the imaging data and the display data (614) and outputting the framed imaging and display data (616). In some embodiments, the imaging data, the display data, and the framed imaging and display data are provided to a multiplexer that is able to select one of the inputs as an output that is provided to a parallel interface. Accordingly, the imaging data (i.e., the raw data from the FPA) can be provided as an output of the system.

It should be appreciated that the specific steps illustrated in FIG. 6A provide a particular method of providing a dual video stream according to an embodiment of the present invention. Other sequences of steps may also be performed according to alternative embodiments. For example, alternative embodiments of the present invention may perform the steps outlined above in a different order. Moreover, the individual steps illustrated in FIG. 6A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6B:
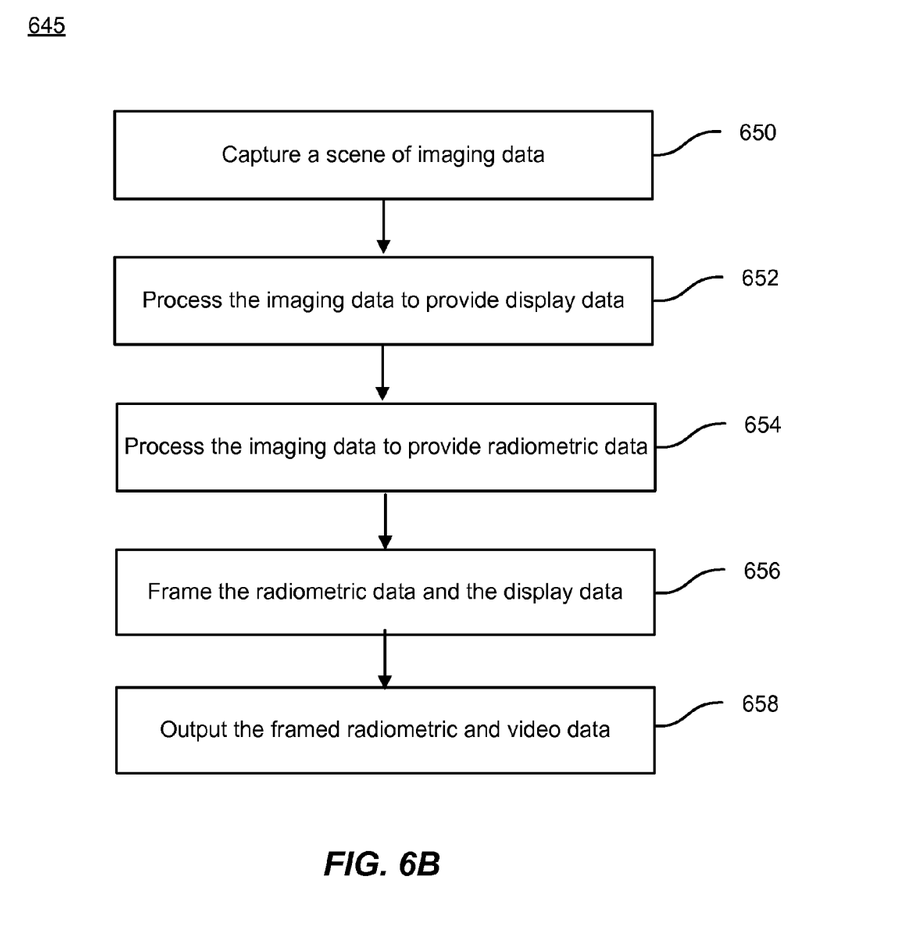
FIG. 6B is a simplified flowchart illustrating a method of providing a dual video stream using radiometry data according to an embodiment of the present invention.

FIG. 6B is a simplified flowchart illustrating a method of providing a dual video stream using radiometry data according to an embodiment of the present invention. The method 645 includes capturing a scene of imaging data using a thermal imager (650). The imaging data is characterized by a first bit depth, for example 14-bits. As part of the process of capturing the scene of imaging data, temperature compensation or non-uniformity correction can be performed as described above. The method also includes processing the imaging data to provide display data characterized by a second bit depth less than the first bit depth (652). As an example, the imaging data can be converted from 14-bits to 8-bits in an embodiment. Processing the imaging data to provide display data can include converting gray scale data to color data for display to a user, performing image contrast enhancement, and the like.

The method further includes processing the imaging data to provide radiometric data characterized by a third bit depth greater than the first bit depth (654). In some embodiments, the 14-bit intensity data is converted to 16-bit radiometric data providing information on the temperature of a pixel rather than the intensity measured for the pixel. As an example, a lookup table can be used in performing the radiometric conversion from intensity data to temperature data. Additionally, the method includes framing the radiometric data and the display data (656) and outputting the framed radiometric and display data (658). In addition to the framed data, the imaging data and the display data can be provided to a multiplexer that can be used to select the desired output.

It should be appreciated that the specific steps illustrated in FIG. 6B provide a particular method of providing a dual video stream using radiometric data according to an embodiment of the present invention. Other sequences of steps may also be performed according to alternative embodiments. For example, alternative embodiments of the present invention may perform the steps outlined above in a different order. Moreover, the individual steps illustrated in FIG. 6B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
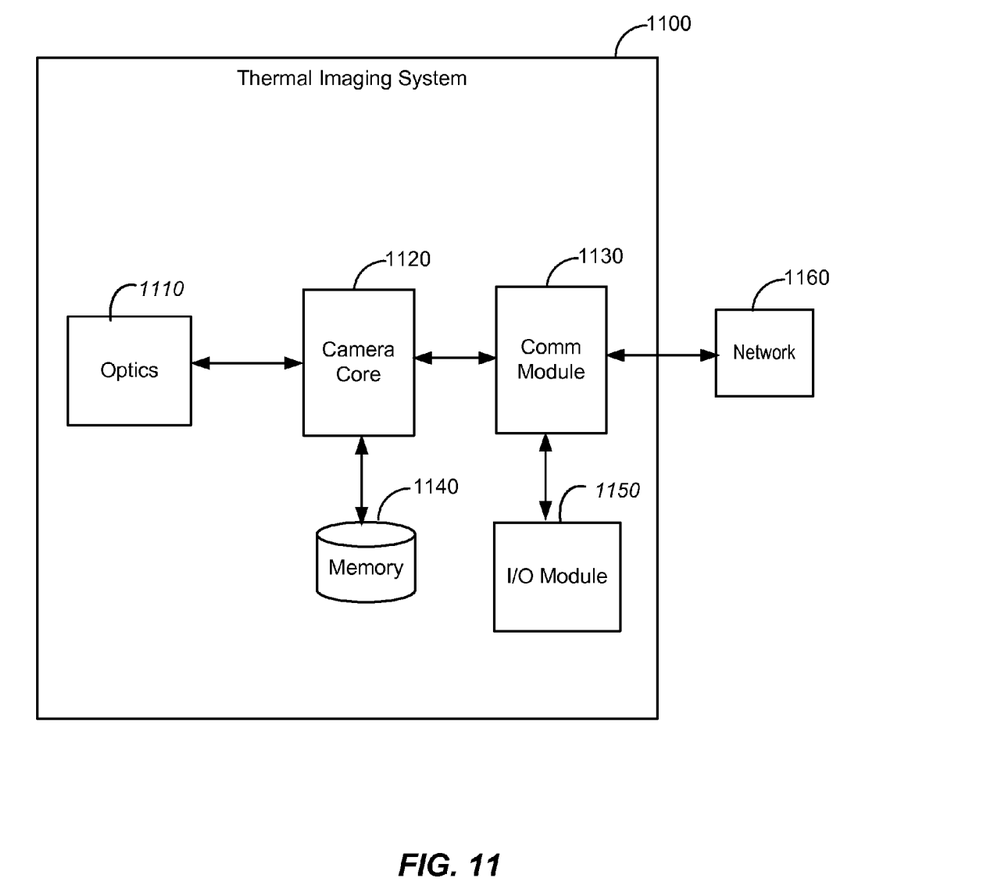
FIG. 11 is a simplified block diagram illustrating a thermal imaging system according to an embodiment of the present invention.

FIG. 11 is a simplified block diagram illustrating a thermal imaging system according to an embodiment of the present invention. As illustrated in FIG. 11, the thermal imaging system 1100 includes one or more optical elements in optics module 1110 that collects infrared light for use in the thermal imaging system. The camera core 1120 is optically coupled to the one or more optical elements and receives the infrared light transmitted through the optics module 1110. As illustrated in FIG. 1, the camera core includes an FPA module providing imaging data at a first bit depth, a color conversion module coupled to the FPA module and providing display data at a second bit depth less than the first bit depth, and a framer coupled to the FPA module and the color conversion module. The framer creates a super frame that includes the imaging data and the display data.

The thermal imaging system also includes a communications module 1130 that is coupled to the camera core. The communications module is operable to interact with network 1160, which can be used to receive thermal imagery from the system, provide control inputs for the system, and the like. Memory 1140 is provided that is able to store data from the camera core, store settings and calibration data used by the camera core, and the like.

The thermal imaging system also includes an input/output module 1150 in the embodiment illustrated in FIG. 11 that is a coupled to the communications module. The I/O module enables a system operator or user to interact with the system to provide command and control functionality. In some embodiments, the I/O module is optional. In other embodiments, the I/O module and the communications module are combined into a single module that provides some or all of the functions described for these separate modules. One of ordinary skill in the art would recognize many variations, modifications, and alternatives.

Figure 7:
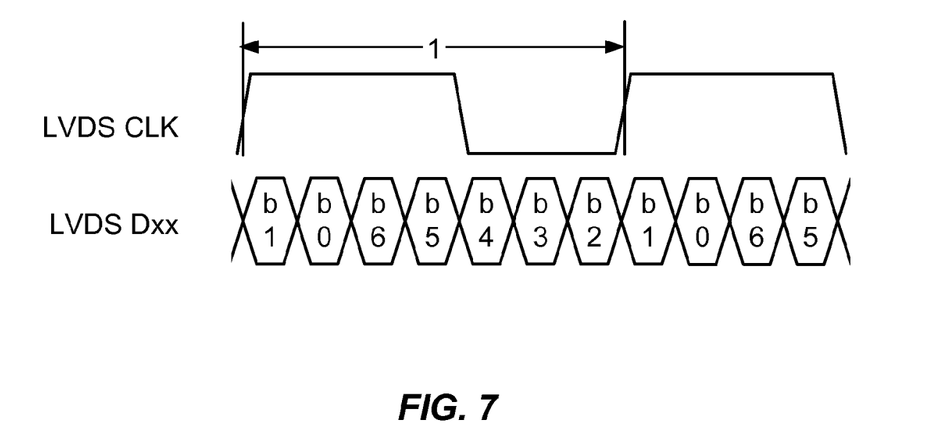
FIG. 7 is an LVDS timing diagram according to an embodiment of the present invention.
Figure 8:
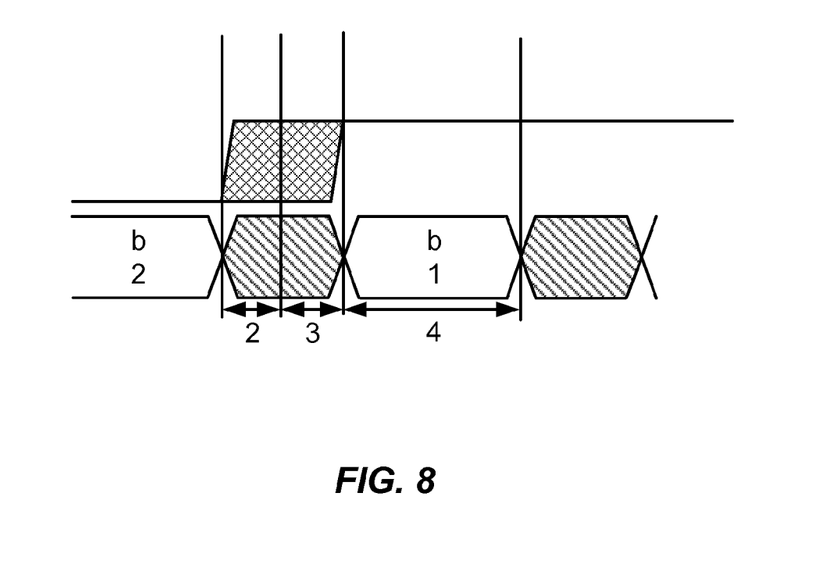
FIG. 8 is an LVDS window timing diagram according to an embodiment of the present invention.

Embodiments of the present invention can utilize an LVDS interface that supports two or more modes of operation: Camera Link® mode and YUV Super frame mode as a serialized version of the parallel output discussed above. The Camera Link® mode is typically used to interface to Camera Link® frame grabbers. The LVDS video interface supports 4 LVDS data pairs and the LVDS clock pair as outputs. The LVDS timing is shown in Table 2, while the timing diagram is shown in FIGS. 7 and 8. The LVDS Clock signal has a non-fifty percent duty cycle. It is based on a 7× internal clock. The LVDS Clock is high for 4 of the 7× clock periods and low for 3. During each clock period, 7 bits are transmitted on each data pair. The bits are transmitted in the order shown in FIG. 7 with each pixel value starting in the middle of the high clock period. The LVDS data window timing is shown in FIG. 8. The maximum delay for the data to become valid after clock and the minimum time data will go invalid before the clock are also described in Table 2, which illustrates the LVDS timing and framing.

TABLE 2

| Number | Parameter | Min | Nom | Max | Units |
|---|---|---|---|---|---|
| 1 | Clock Period | | 48.6 | | ns |
| | 7x Internal Clock Freq. | | 144 | | MHz |
| | Bit time | | 5.94 | | ns |
| 2 | Data no longer valid before clock | | | 0.4 | ns |
| 3 | Clock to data valid | | | 0.4 | ns |
| 4 | Data valid window | 6.14 | | | ns |
| #LINES | Lines per frame | | 480 | | |
| #PIXELS_CL | Pixels per line in Camera Link Mode | | 640 | | |
| #PIXELS_YUV | Pixels per line in YUV-SF Mode | | 1280 | | |

Figure 9:
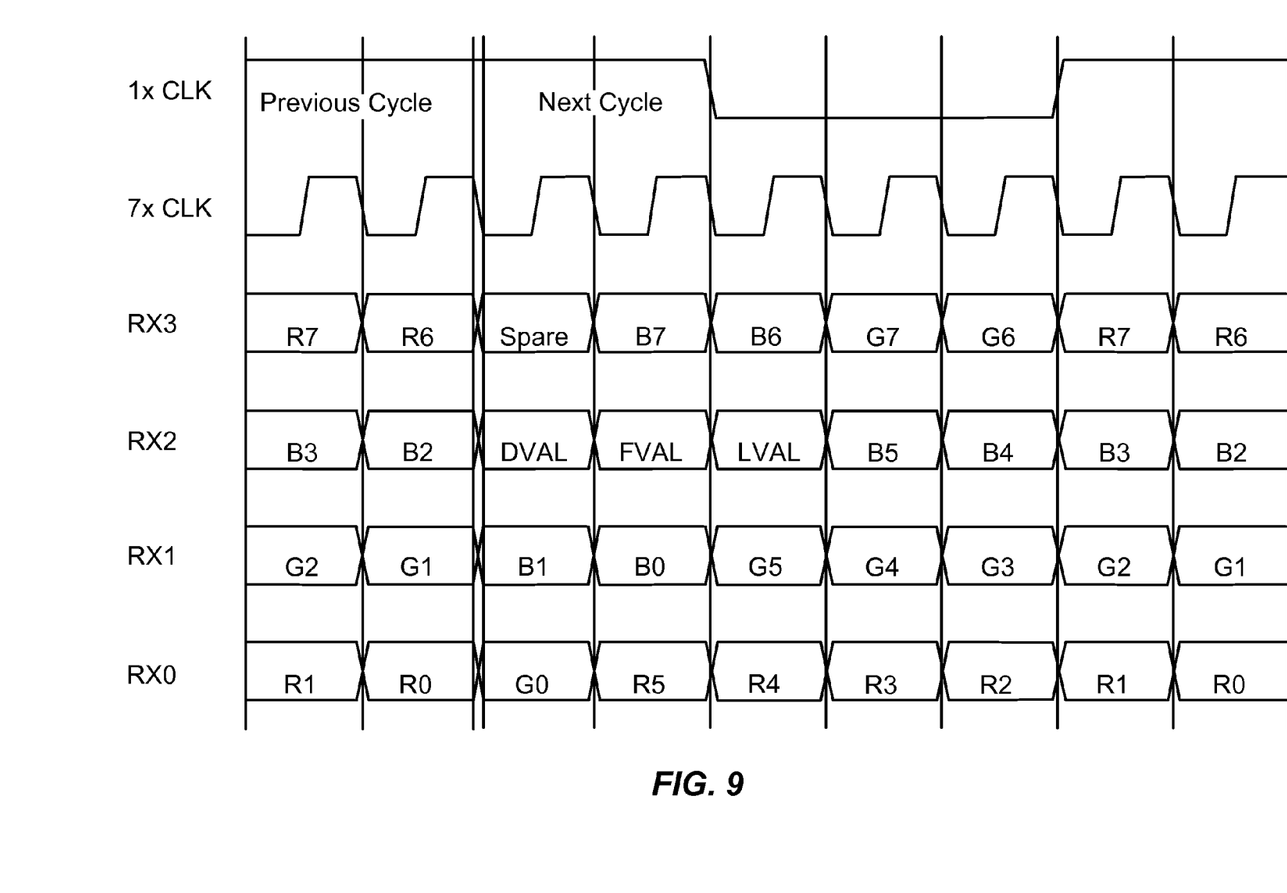
FIG. 9 illustrates the mapping of a Camera Link® serialized bit stream to a 24 bit RGB color bit stream according to an embodiment of the present invention.

FIG. 9 shows the mapping of a Camera Link® serialized bit stream to a 24 bit RGB color bit stream. FVAL is low (invalid) between frames while LVAL is low (invalid) between lines. DVAL is high to indicate that the data is valid. A frame will consist of FVAL going high (valid) for an entire frame.

Blanking time is inserted between each frame while FVAL is low. A line will consist of LVAL going high (valid) for an entire line. Blanking time is inserted between each line while LVAL is low. The amount of horizontal and vertical blanking can change based on operating modes and Camera revisions.

The LVDS Interface supports three interface formats in the embodiment illustrated in FIG. 9:

1. 14-bit/8-bit Gray Scale
2. 24-bit RGB
3. YUV Super frame

The 14-bit Gray Scale format is used to support the 14-bit and 8-bit gray scale data modes. The 14-bit and 8-bit Gray Scale mapping follows the Camera Link® standard and maps as shown in Table 3. The 24-bit RGB format is used to support the colorization data mode and uses the standard Camera Link® 24-bit RGB format. The 24-bit RGB format can be utilized as an alternative implementation compared to the 4:2:2 color mode discussed previously. As will be evident to one of skill in the art, the 4:2:2 color mode uses 16 bits per pixel, which is less than the 24 bits per pixel used in the 24-bit RGB format. Accordingly, the 4:2:2 color mode can be utilized in place of the 24-bit RGB format. Thus, the super frame can be sent through the LVDS Camera Link® interface using the bit mapping illustrated in Table 3.

TABLE 3

| Camera Link® 24-Bit color Mode | 14-bit data Mode | 8-bit data Mode | YUV Super frame Mode |
|---|---|---|---|
| G7 | Not Used | Not Used | Bit 15 |
| G6 | Not Used | Not Used | Bit 14 |
| G5 | Bit 13 | Bit 7 | Bit 13 |
| G4 | Bit 12 | Bit 6 | Bit 12 |
| G3 | Bit 11 | Bit 5 | Bit 11 |
| G2 | Bit 10 | Bit 4 | Bit 10 |
| G1 | Bit 9 | Bit 3 | Bit 9 |
| G0 | Bit 8 | Bit 2 | Bit 8 |
| R7 | Bit 7 | Bit 1 | Bit 7 |
| R6 | Bit 6 | Bit 0 | Bit 6 |
| R5 | Bit 5 | Not Used | Bit 5 |
| R4 | Bit 4 | Not Used | Bit 4 |
| R3 | Bit 3 | Not Used | Bit 3 |
| R2 | Bit 2 | Not Used | Bit 2 |
| R1 | Bit 1 | Not Used | Bit 1 |
| R0 | Bit 0 | Not Used | Bit 0 |

In YUV Super frame mode, a 16-bit video stream is mapped into the Camera Link® Interface as shown in Table 3. The YUV Super frame consists of 480 lines with each line containing 1280 values. The first 640 values contain YCbCr generated values for the pixels of that line with the second 640 values containing the pre-AGC values for that line (currently the pre-AGC values are from the frame before the current YCbCr frame, this allows time for analytics to analyze the pre-AGC data so additional overlays can be added to the YCbCr data stream by customer analytics).

Figure 10:
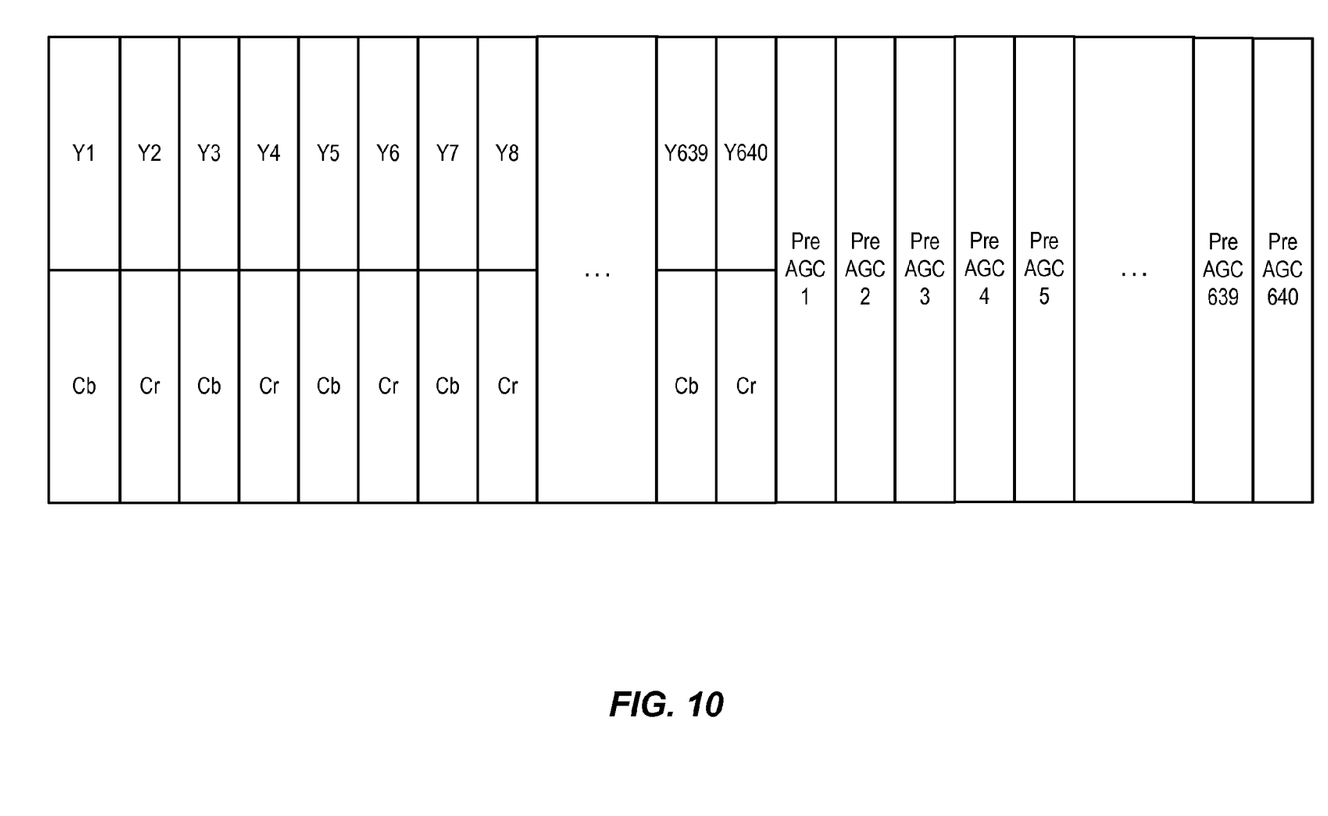
FIG. 10 illustrates a YUV super frame line format for one line of data according to an embodiment of the present invention.

FIG. 10 illustrates a YUV Super frame line format for one line of data according to an embodiment of the present invention. The first Cb and Cr data is generated on the average of the first two pixels. The second Cb and Cr data is generated on pixels 3 and 4 with all further Cb/Cr pairs calculated in a relative manner. The Pre-AGC data is LSB aligned so if the Pre-AGC data is only 14-bits, it will only occupy the lower 14 bits of the data path respectively.

Table 4 illustrates timing for several modes of operation according to an embodiment of the present invention. The modes of operation are associated with the four inputs provided to the multiplexer 140 in FIGS. 1 and 2. As discussed above, although not illustrated in FIG. 1 or 2, the super frame could be formed using the 8-bit AGC and the raw data (FIG. 1) or the 8-bit AGC and the 16-bit radiometric data (FIG. 2). One of ordinary skill in the art would recognize many variations, modifications, and alternatives.

TABLE 4

| Camera Type | Mode of Operation | Pixel clocks per data sample | Frame Rate (Hz) | Pixel Clock (MHz) | Effective Frame Rate (Mbps) |
|---|---|---|---|---|---|
| Tamarisk 320 | 8-bit AGC | 1 | 60 | 5 | 37 |
| | 4:2:2 Color | 1 | 60 | 5 | 74 |
| | 14-bit Raw | 1 | 60 | 5 | 74 |
| | 4:2:2/Raw Super Frame | 4 | 30 | 24 | 74 |
| Tamarisk 640 | 8-bit AGC | 1 | 30 | 10 | 74 |
| | 4:2:2 Color | 1 | 30 | 10 | 148 |
| | 14-bit Raw | 1 | 30 | 10 | 148 |
| | 4:2:2/Raw Super Frame | 4 | 15 | 24 | 148 |

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a thermal imaging system, the method comprising:
   capturing a scene of imaging data using a thermal imager, wherein the imaging data is characterized by a first bit depth;
   processing the imaging data to provide display data characterized by a second bit depth less than the first bit depth;
   processing the imaging data to provide radiometric data characterized by a third bit depth greater than the first bit depth;
   framing the radiometric data and the display data; and
   outputting the framed radiometric and display data.

2. The method of claim 1 wherein processing the imaging data to provide display data comprises converting gray scale data to color data.

3. The method of claim 1 wherein the first bit depth comprises 14 bits, the second bit depth comprises 8 bits, and the third bit depth comprises 16 bits.

4. The method of claim 1 wherein processing the imaging data to provide radiometric data comprises using a lookup table.

5. The method of claim 1 wherein capturing the scene of imaging data comprises performing at least one of temperature compensation or non-uniformity correction.

6. The method of claim 1 further comprising providing the imaging data, the display data, and the framed imaging and display data to a multiplexer.

7. The method of claim 1 wherein processing the imaging data to provide display data comprises processing the imaging data using an image contrast enhancement unit.

* * * * *